P. FREEMAN.
Gate.
No. 55,481. Patented June 12, 1866.
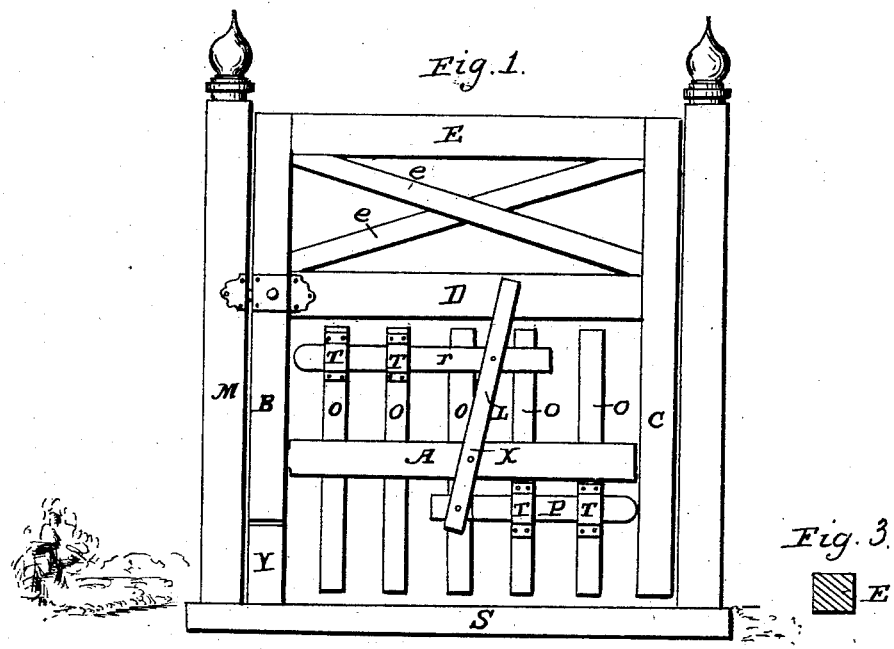
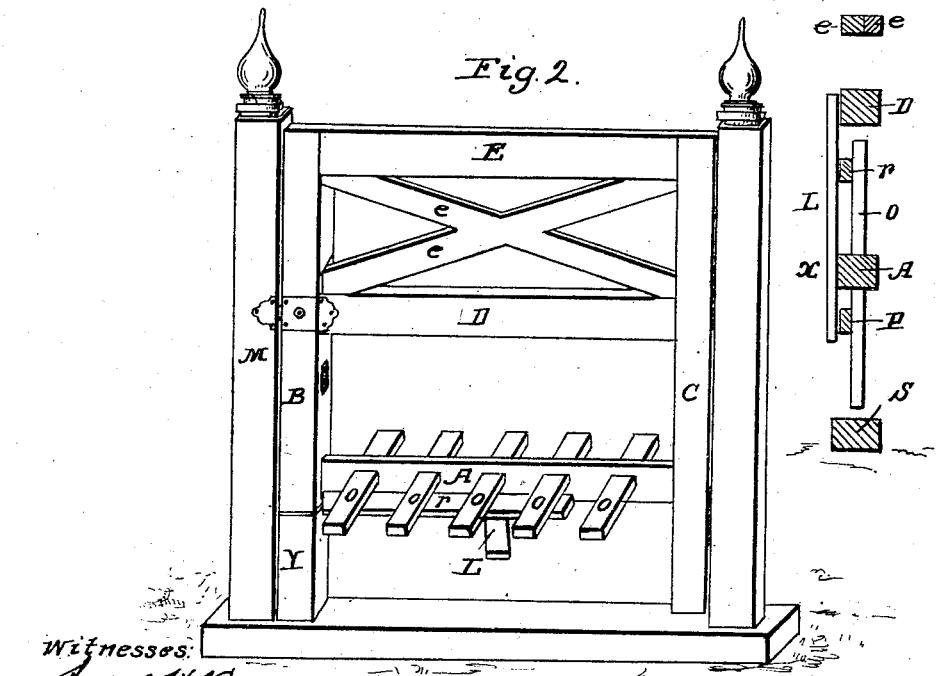

UNITED STATES PATENT OFFICE.

PATRICK FREEMAN, OF LEROY TOWNSHIP, BENTON COUNTY, IOWA.

IMPROVEMENT IN GATES.

Specification forming part of Letters Patent No. 55,481, dated June 12, 1866.

*To all whom it may concern:*

Be it known that I, PATRICK FREEMAN, of Leroy township, in the county of Benton and State of Iowa, have invented a new and useful Improvement on Gates, called "Double-Locked Revolving Stock-Gate;" and I do hereby declare that the following is a full and exact description thereof, reference being had to the accompanying drawings, and to the letters of reference marked thereon, forming part of this specification, in which—

Figure 1 represents the elevation of the gate. Fig. 2 represents a perspective view of gate with reel open. Fig. 3 represents a cross-section through middle of gate.

Similar letters of reference indicate corresponding parts in all the figures.

The object of the invention is for this gate to possess all the advantages of gates now in ordinary use; also, to open with ease in case of common obstructions, such as snow-drifts, accumulated dirt, or rubbish; and also to allow the passage of small animals, such as hogs, sheep, and calves, when desirable to separate them from the larger animals usually kept on farms; and, by means of arrangements hereinafter described to double lock it, and thus add to its intended purpose.

The form of the frame, posts, and sill will not materially vary from those of the gates now in use. About thirty inches above the sill S, Figs. 1, 2, 3, is a stout rectangular arm or shaft, A, with a circular tenon on each end, to revolve in corresponding mortises made to receive them in posts B and C. Through the center of this arm or shaft A will be inserted any desired number of vertical slats $o$ through mortises, (or otherwise fastened on.) A short distance above the slats or bars $o$ will be mortised and firmly secured another arm, D, and, in order to add to the strength of the gate or skeleton, will be inserted braces $e\ e$ between this arm D and the top rail, E, of the gate-frame.

Upon the outside of the slats $o$, above and below the central shaft, will be placed a sliding bar, $r\ p$, fastened by screws to the lever L, which moves to the right or left on a pivot, $x$, on the shaft A. To retain these bars or bolts $r\ p$ in their respective places with regard to the slats $o$, and enable them to move freely to the right or left, two clasps, T, will be secured to each of the two slats next their respective posts B and C, and thus, from the motion of the lever L, to allow the bars to which they are attached to move to or from their respective mortises or sockets in the gate-posts B and C, thus lock or unlock the lower portion of the gate, which may be brought to a horizontal position when open, as in Fig. 2, by reversing shaft A, to which the lever L and slats $o$ are attached, thus affording space for the passage of small animals or access over impediments before mentioned.

An ordinary lock can be attached on post B, to secure the gate to outer post, M. The gate when closed will rest on the short post $y$, Figs 1 and 2.

What I claim as my invention, and desire to secure by Letters Patent, is—

The reel or revolving part of the gate upon the shaft A, together with the locking-bolts $r$ and $p$, substantially as and for the purpose herein specified.

PATRICK FREEMAN.

Witnesses:
 AMOS H. KAGY,
 J. N. W. RUMPLE.